United States Patent
Arthur et al.

(10) Patent No.: US 12,554,961 B2
(45) Date of Patent: Feb. 17, 2026

(54) BLOCK TRANSFER OF NEURON OUTPUT VALUES THROUGH DATA MEMORY FOR NEUROSYNAPTIC PROCESSORS

(71) Applicant: INTERNATIONAL BUSINESS MACHINES CORPORATION, Armonk, NY (US)

(72) Inventors: John V. Arthur, Mountain View, CA (US); Pallab Datta, San Jose, CA (US); Steven K. Esser, San Jose, CA (US); Dharmendra S. Modha, San Jose, CA (US); Jun Sawada, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 843 days.

(21) Appl. No.: 15/941,985

(22) Filed: Mar. 30, 2018

(65) Prior Publication Data

US 2019/0303740 A1 Oct. 3, 2019

(51) Int. Cl.
*G06N 3/04* (2023.01)
*G06N 3/049* (2023.01)
*G06N 3/063* (2023.01)

(52) U.S. Cl.
CPC ............... *G06N 3/04* (2013.01); *G06N 3/049* (2013.01); *G06N 3/063* (2013.01)

(58) Field of Classification Search
CPC ........... G06N 3/04; G06N 3/049; G06N 3/063
See application file for complete search history.

(56) References Cited

U.S. PATENT DOCUMENTS

| | | | |
|---|---|---|---|
| 9,262,712 B2 | 2/2016 | Modha | |
| 9,753,959 B2 | 9/2017 | Birdwell et al. | |
| 2011/0289034 A1* | 11/2011 | Palmer | G06N 3/063 706/26 |
| 2014/0180984 A1 | 6/2014 | Arthur et al. | |

(Continued)

FOREIGN PATENT DOCUMENTS

| | | | | |
|---|---|---|---|---|
| EP | 3340119 A1 * | 6/2018 | ............ | G06N 3/088 |
| WO | 2014/041443 A1 | 3/2014 | | |
| WO | 2019/185634 A1 | 10/2019 | | |

OTHER PUBLICATIONS

Zhang et al. Feedforward Sequential Memory Neural Networks without Recurrent Feedback. 2015 (Year: 2015).*

(Continued)

*Primary Examiner* — Michelle T Bechtold
*Assistant Examiner* — Robert Bejcek, II
(74) *Attorney, Agent, or Firm* — Amin, Turocy & Watson, LLP

(57) ABSTRACT

Block transfer of neuron output values through data memory for neurosynaptic processors is provided, which in some embodiments includes time-multiplexing. A neurosynaptic core is adapted to apply a plurality of synaptic weights to a plurality of input activations to produce a plurality of output activations. Synaptic weights for one of a plurality of logical cores are read. The neurosynaptic core is configured to implement the one of the plurality of logical cores using the synaptic weights. At least one data block is provided as contiguous input activations to the neurosynaptic core. The input activations are processed by the neurosynaptic core to determine at least one contiguous block of output activations.

22 Claims, 9 Drawing Sheets

(56) References Cited

U.S. PATENT DOCUMENTS

2015/0324684 A1    11/2015   Alvarez-Icaza Rivera et al.
2018/0314941 A1*   11/2018   Lie .......................... G06N 3/04

OTHER PUBLICATIONS

International Search Report and Written Opinion for International Application No. PCT/EP2019/057602 dated Jul. 3, 2019.
Song et al., "STT-RAM Buffer Design for Precision-Tunable General-Purpose Neural Network Accelerator," IEEE 25(4):1285-1296 (2017).

* cited by examiner

BLOCK TRANSFER OF NEURON OUTPUT VALUES THROUGH DATA MEMORY FOR NEUROSYNAPTIC PROCESSORS

BACKGROUND

Embodiments of the present disclosure relate to neurosynaptic cores and neurosynaptic systems, and more specifically, to block transfer of neuron output values through data memory for neurosynaptic processors, which in some embodiments includes time-multiplexing.

BRIEF SUMMARY

According to embodiments of the present disclosure, neurosynaptic systems are provided. A neurosynaptic core is adapted to apply a plurality of synaptic weights to a plurality of input activations to produce a plurality of output activations. The system is adapted to perform a method comprising: reading synaptic weights for one of a plurality of logical cores; configuring the neurosynaptic core to implement the one of the plurality of logical cores using the synaptic weights; providing at least one data block as contiguous input activations to the neurosynaptic core; and processing the input activations by the neurosynaptic core to determine at least one contiguous block of output activations.

According to embodiments of the present disclosure, methods of and computer program products for executing a neural network program are provided. In various embodiments, synaptic weights for one of a plurality of logical cores are read. A neurosynaptic core is configured to implement the one of the plurality of logical cores using the synaptic weights. The neurosynaptic core is adapted to apply a plurality of synaptic weights to a plurality of input activations to produce a plurality of output activations. At least one data block is provided as contiguous input activations to the neurosynaptic core. The input activations are processed by the neurosynaptic core to determine at least one contiguous block of output activations.

DETAILED DESCRIPTION

Figure 1:
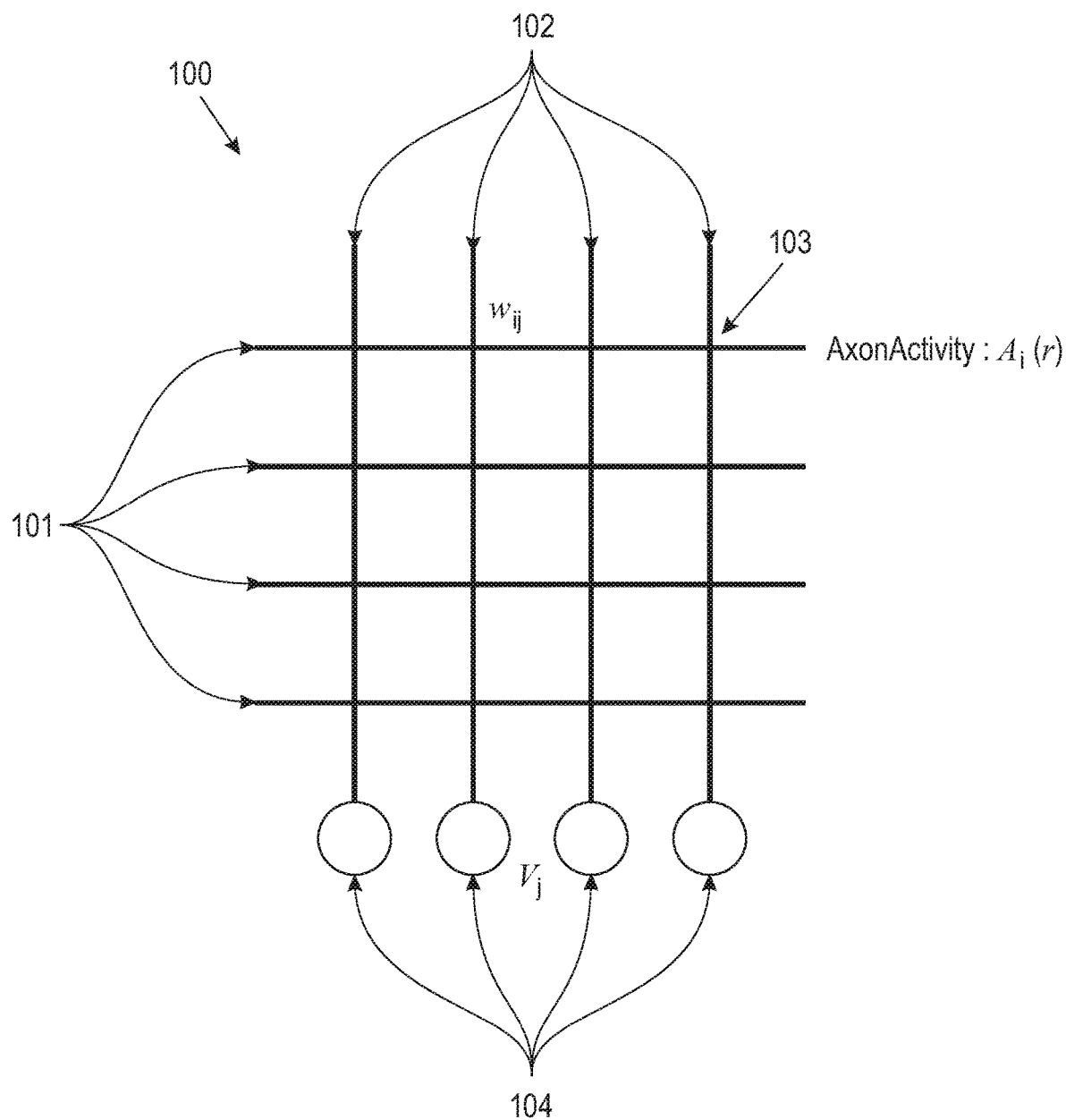
FIG. 1 depicts a neurosynaptic core according to embodiments of the present disclosure.

Arrays of extremely low power neurosynaptic processing units, called neurosynaptic cores, provide an architecture to solve exascale big data problems. These cores use spikes or neuron activations to encode information. In a network of neurosynaptic cores, neurons on each core can connect to any axon of any other neurosynaptic core (including itself). When a neuron activates, it sends a packet that gets delivered to a target axon on a destination core. It will be appreciated that neuron activations may be distributed in various ways, including via an on-chip network. Various examples herein refer to spikes transmitted over a network, however, it will be appreciated that the present disclosure applies more generally to any neurosynaptic system and to neuron activations irrespective of transport mechanism.

A neurosynaptic core in general includes axons, generally represented as rows, dendrites, generally represented as columns, synapses, generally represented as row-column junctions, and neurons that receive inputs from dendrites and provide output activations. Information flows from axons to the neurons, modulated by the synapses. In various embodiments, the synapses may be binary, and may be associated with synaptic weights. Neurosynaptic cores may be combined to form an Artificial Neural network.

In digital neuromorphic systems, information is represented and delivered by spikes or neuron activations. In various embodiments, each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neurosynaptic cores, where each of the smaller networks, in turn, could be constructed by interconnecting a set of even smaller networks, and so on, down to a network consisting of a single neurosynaptic core, which is the fundamental non-divisible building block. This programming paradigm is referred to as Corelet Programming.

In other neural processing cores, a layer of a neural network is represented as a tensor, and the computation of neuron activations is performed as a matrix multiplication on a suitable processor. However, it will be appreciate that the present disclosure is applicable to a variety of computation cores.

With reference now to FIG. 1, a neurosynaptic core according to embodiments of the present disclosure is depicted. In some embodiments, neurosynaptic core 100 includes axons 101, represented as rows, dendrites 102, represented as columns, synapses 103, represented as row-column junctions, and neurons 104 that receive inputs from dendrites. In some embodiments, there are 256 axons, and 256 neurons. In such embodiments, there are 256×256=65,536 synapses. Information flows from axons 101 to the neurons 104, modulated by the synapses 103. In various embodiments, the synapses may be binary, and may be associated with synaptic weights.

Figure 2:
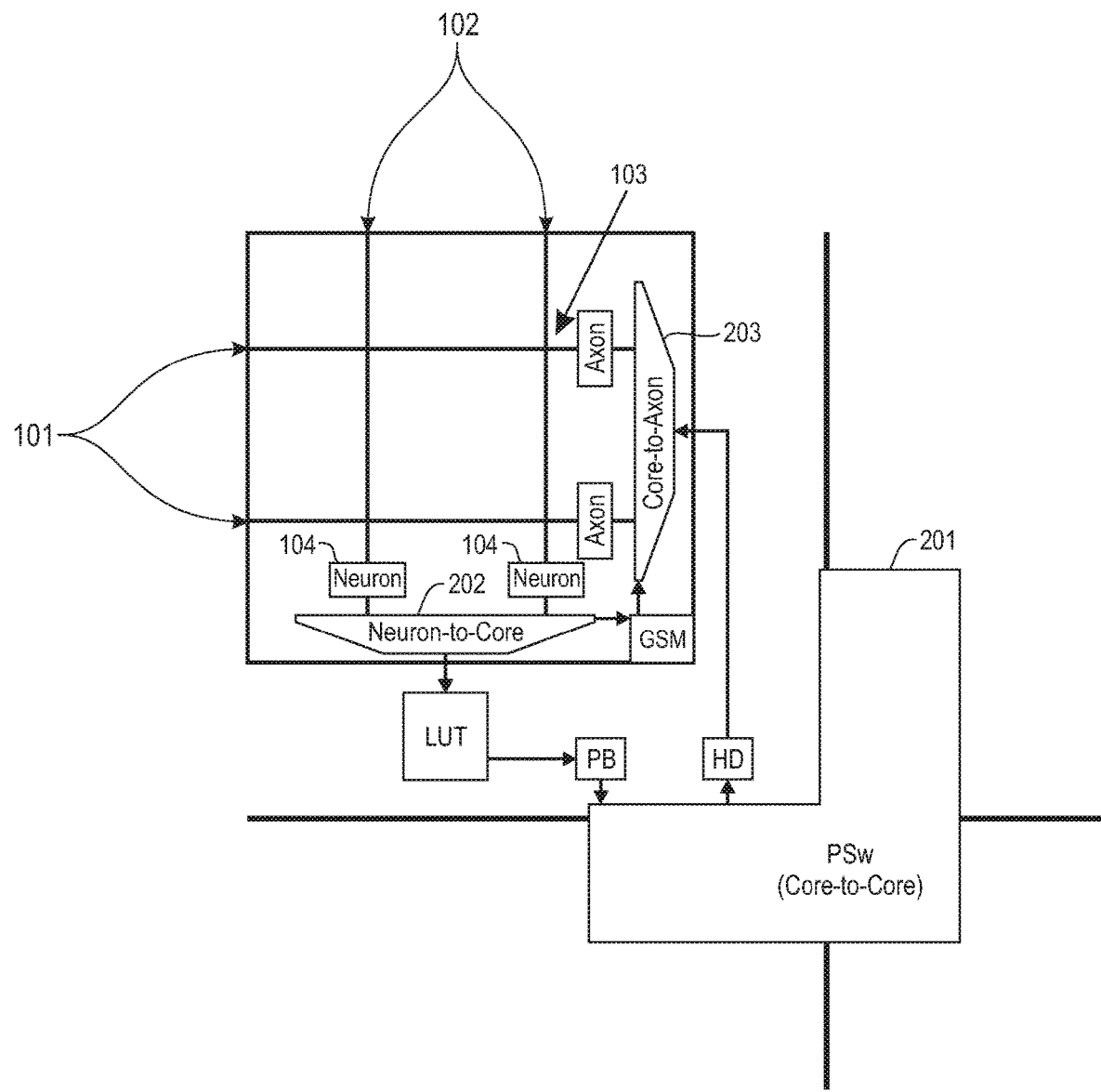
FIG. 2 depicts a neurosynaptic core and mesh router according to embodiments of the present disclosure.

In some embodiments a plurality of neurosynaptic cores are tiled on a chip. In an exemplary embodiments, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 2. Mesh router 201 provides communication between cores. Also on a given core, neuron to core 202 and core to axon 203 communication links are provided.

Figure 3:
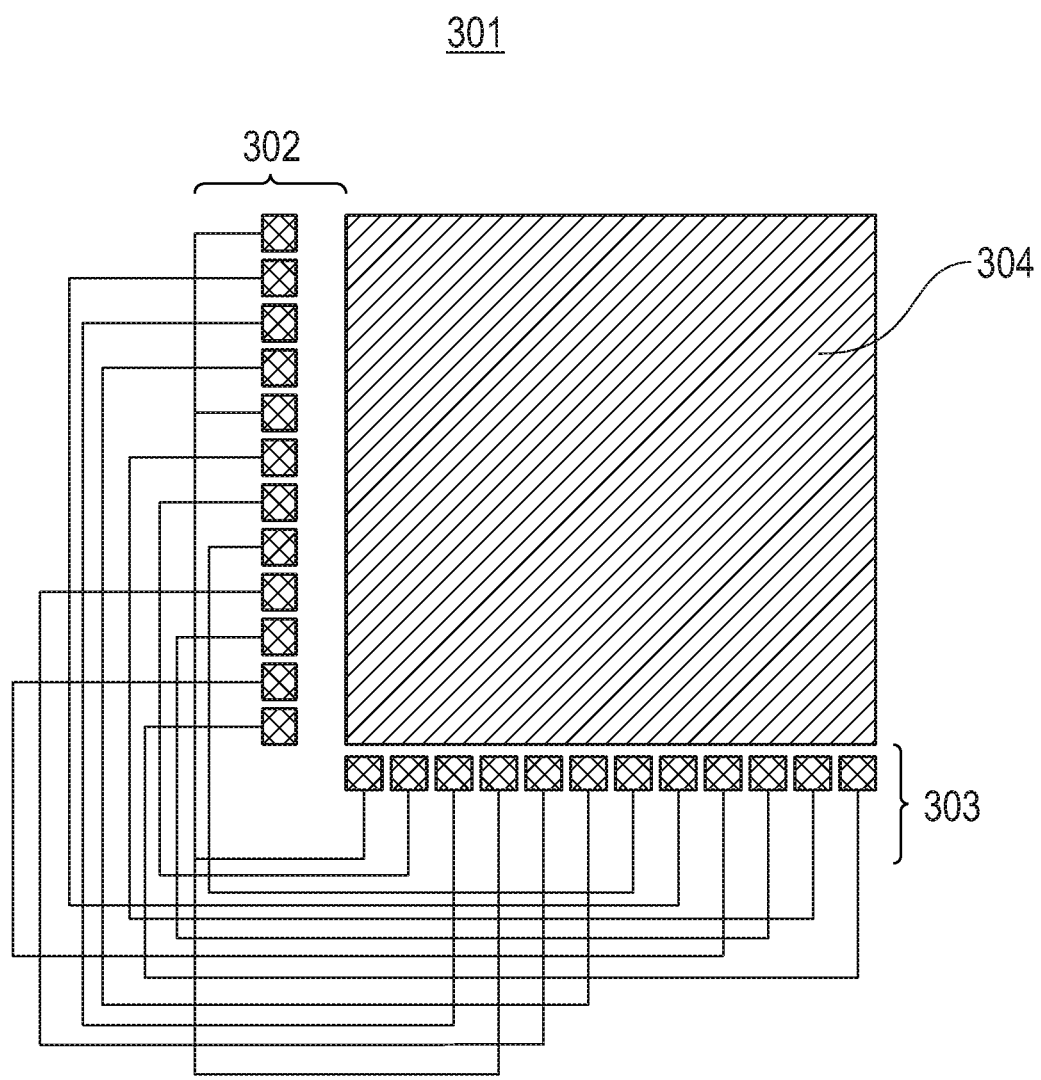
FIG. 3 illustrates connectivity between neurons and axons in an exemplary neuromorphic core according to embodiments of the present disclosure.

Referring now to FIG. 3, the connectivity between neurons and axons in an exemplary neuromorphic core is illustrated. In TrueNorth and other similar neuromorphic platforms, each neuron is connected to an axon. In this example, core 301 includes 256 axons inputs 302 and 256 neuron outputs 303, connected by a 256×256 array of synapses 304. As illustrated, each of 256 axon inputs 302 are individually accessed and 256 neuron outputs 303 are individually connected to target axons. This computation is carried out by a router. However, arbitrary connectivity from any neuron to any axon is computationally hard and imposes a performance bottleneck.

Figure 4:
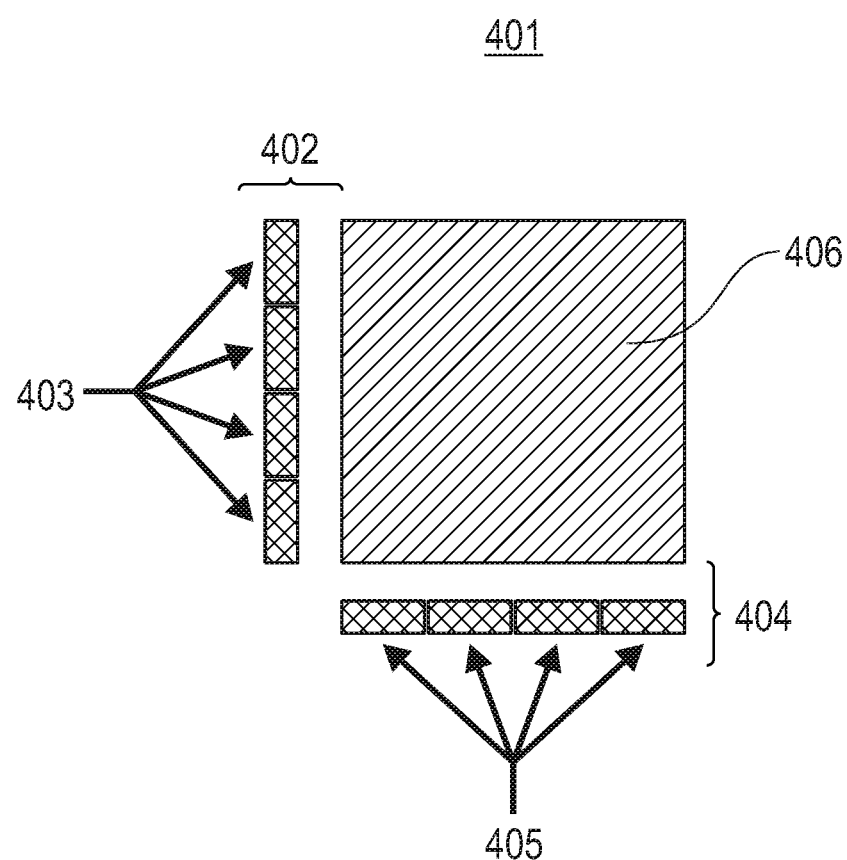
FIG. 4 illustrates an exemplary embodiment of a logical core according to embodiments of the present disclosure.
Figure 5:
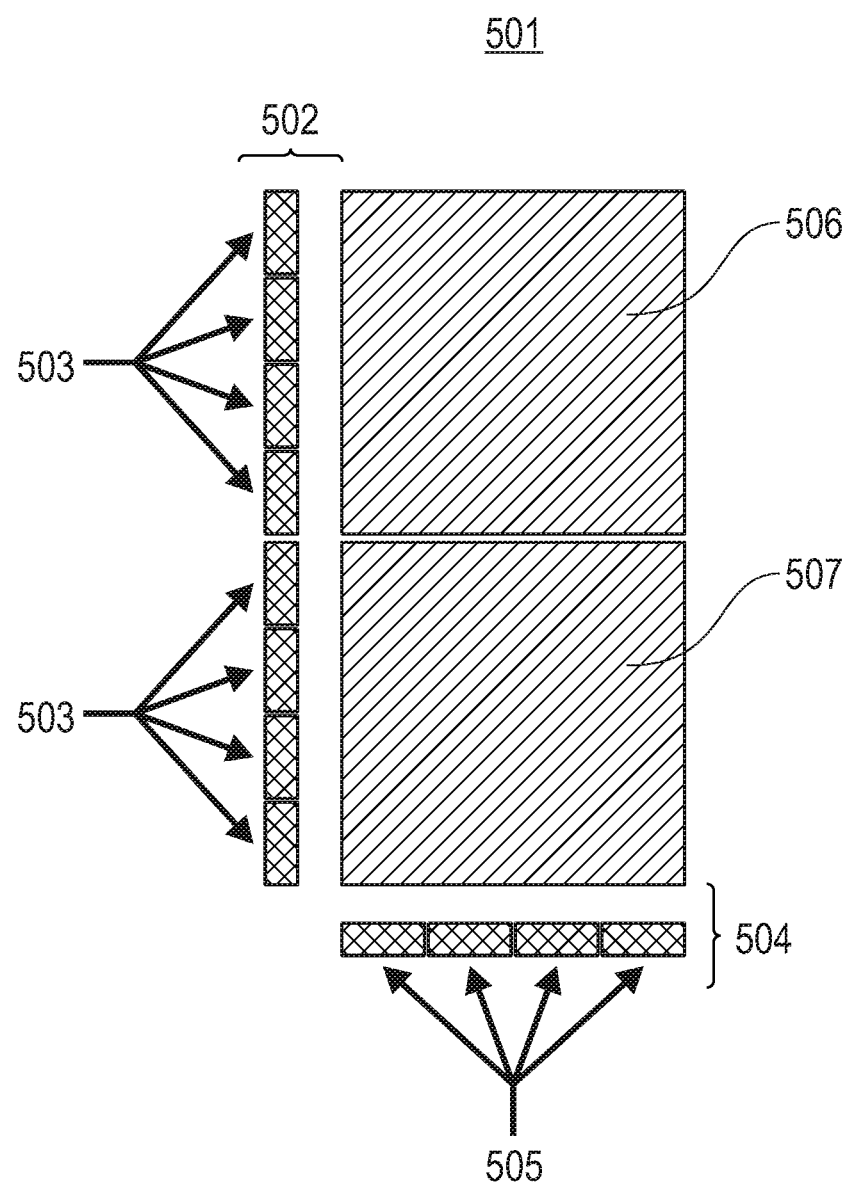
FIG. 5 illustrates an exemplary embodiment of a logical core according to embodiments of the present disclosure.

Referring now to FIGS. 4-5, exemplary embodiments of logical cores according to embodiments of the present disclosure are illustrated. Neuron activations are divided into n blocks. In some embodiments n=4. Neurons and axons are communicated in blocks of m neurons. In some embodiments, m=64. Each synapse takes values in a discrete set. In some embodiments, the set is {−1, 0, +1} (trinary).

In FIG. 4, core 401 includes a plurality of axon inputs 402, which are divided into four blocks 403, having 64 axons each. A plurality of neuron outputs 404 are divided into four blocks 405, having 64 axons each. The axons and neurons are connected by a 256×256 array of synapses 406.

In FIG. 5, core 501 includes a plurality of axon inputs 502, which are divided into eight blocks 503, having 64 axons each. A plurality of neuron outputs 504 are divided into four blocks 505, having 64 axons each. The axons and neurons are connected by a 512×256 array of synapses 506 . . . 507. As pictured, the synapses are divided into two square 256×256 arrays. As set out further herein, arrays 506 . . . 507 may be time-multiplexed. In this way, arrays 506 . . . 507 may be executed on the same physical 256×256 array. It will be appreciated that this is only exemplary, and synapse arrays may be of various dimensions, and may be assembled from various sized constituent arrays.

A core connects A axons to N neurons. As illustrated above, in various embodiments, A and N may be chosen independently. For example, A can be 256, 512, 768, or 1024. Given a block size of 64 neurons, this would result in 4 blocks, 8 blocks, 12 blocks, or 16 blocks, respectively. Likewise, N can be, for example. 64, 128, 192, or 256. A core would therefore implement A×N synapses.

Figure 6:
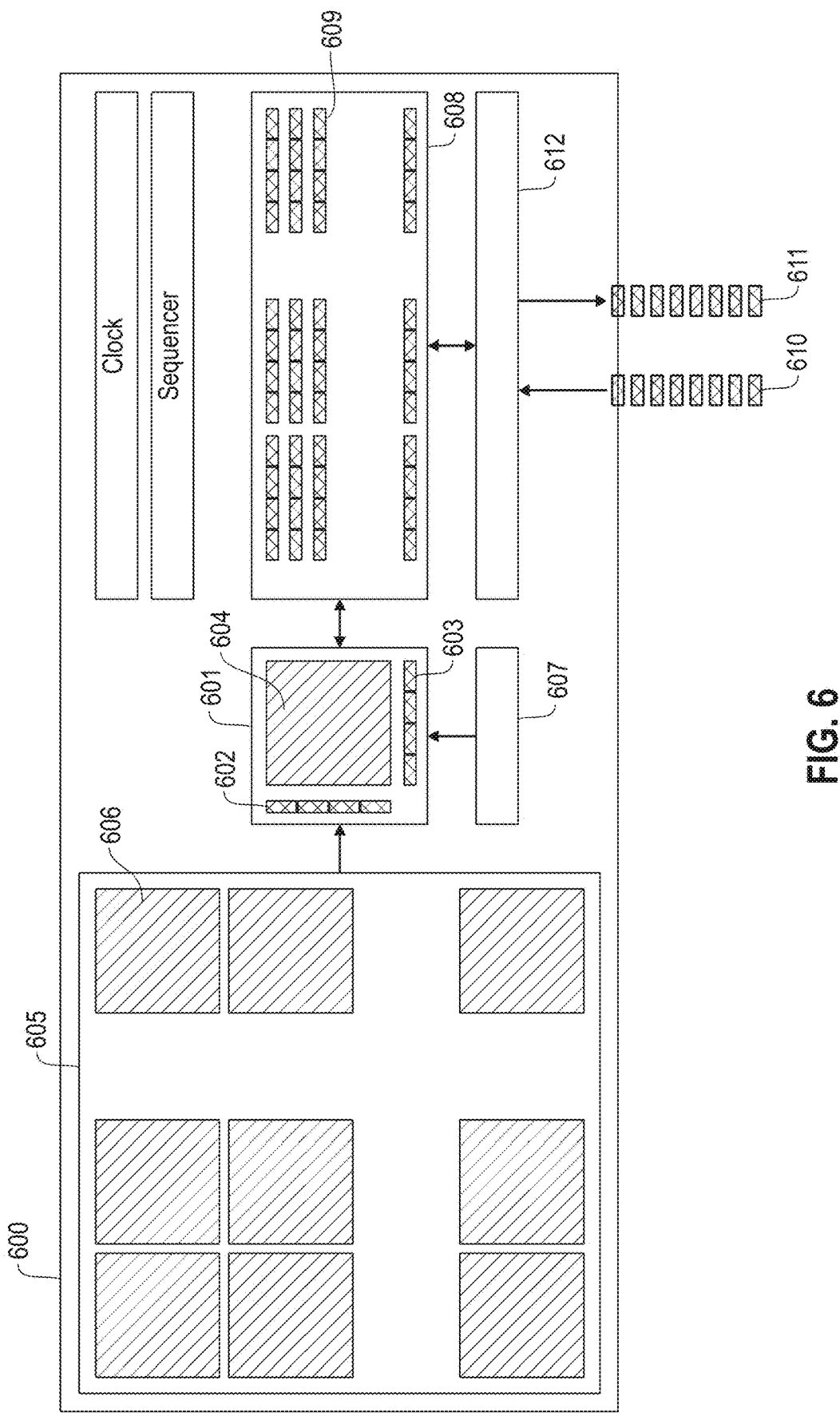
FIG. 6 illustrates a physical architecture suitable for execution of a plurality of logical cores according to embodiments of the present disclosure.

Referring to FIG. 6, a physical architecture suitable for execution of a plurality of logical cores is illustrated according to the present disclosure. A physical core 601 includes a plurality of axons 602 and a plurality of neurons 603, connected by a synapse array 604. A synapse memory 605 includes a plurality of synapse configurations 606. A neuron parameter memory 607 includes neuron parameters and destination information. A data memory 608 includes a plurality of data blocks 609. Interface 612 reads from and writes to data memory 608, processing input stream 610 and generating output stream 611. In some embodiments, interface 612 is a memory-mapped interface. For example, a segmented memory map may be provided with multiple regions allocated to the inputs and outputs of each of various logical cores. In this way, access to input and output data of each logical core may be provided. It will be appreciated that a variety of memory addressing schemes are suitable for use according to the present disclosure. For example, block indices may be used to access data within the memory. Alternatively, absolute addresses and offsets may be used. In various embodiments, a logical core identifier is used to identify blocks of input or output data, which may be remapped to physical memory via a lookup table.

In this configuration, physical core 601 may be time-multiplexed to implement multiple local cores in sequence. In particular, at each time step, a synapse memory block 606 is read in from the synapse memory 601 or the synapse memory block currently loaded in the physical core 601 is reused. Axon blocks 609 are read in from data memory 608 from arbitrary addresses, and sent to axon input 602 of core 601. As noted above, in some embodiments, each axon block is 64 bits. In such embodiments, four 64-bit axon blocks may be combined to create a full 256-bit axon input vector. Values from the previous iterations may be reused. Neuron parameters and destinations are read in from neuron parameters memory 607 or are reused from the past step. These may be read block by block.

Physical core 601 then computes neuron activations for all the neurons for the core. Neuron output blocks 603 are then written back to the data memory 608. In some embodiments, each block is 64-bits. Some of the computation result may be retained at the physical core for the next computation step.

In this way, a logical core may connect with other logical cores via data memory 608. A logical core writes its computed neuron activations in one or more neuron block (e.g., of 64 bits) to data memory 608. A logical core reads from one or more 64 element blocks in data memory to its axons for computation. To accommodate this process, the synaptic matrix of a given logical core may be rearranged in such a way that 64-bit contiguous neuron blocks can be directly used in the computation in the next layer, without bit-by-bit reshuffling (but with block by block reshuffling).

In various embodiments, each neuron circuit has a highly-parallel dendritic tree. Each dendritic tree may be fully pipelined. Similarly, each logical core may have a single dendritic tree, or multiple dendritic trees, accelerating the computation.

Taking the above example of a 256×256 physical core, 256 dendritic trees may be accommodated, computing 256 synaptic integrations in parallel, yielding 128 k computing operations per cycle. In various implementations, the number of dendritic trees may be a power of 2 between 1 and 256, for example. If 8 dendritic trees are implemented in a core, each tree is responsible for computing 32 neurons.

Given a network of logical cores, a schedule provides the sequence in which the logical cores are loaded on the physical core so as to guarantee the correctness of the computation. An efficient schedule sequences logical cores to minimized movement of data from synapse memory and from data memory.

Various embodiments may include different amounts of synapse memory, data memory, neuron parameter memory. Likewise, various embodiments may provide different amounts of parallelism within each core.

It will be appreciated that although various examples provided herein depict separate synapse, data, and neuron parameter memories, a single unified memory may be used in certain embodiments. In some such embodiments, the address boundary of each data type is set by pointer registers.

As described above, various embodiments employ block addressing. Accordingly, an API may be provided that carries out each transaction in terms of blocks of bits. This correspond to the underlying architecture, and enables data to be transferred in blocks between hardware and software through a memory mapped interface. However, it will be appreciated that alternative addressing methods may be used in embodiments according to the present disclosure.

In an exemplary embodiments of a computation API, computation primitives are defined that map onto a plurality of neural network chip logical cores. For example, a convolution operator may be defined that maps onto a set of logical cores. Likewise, a memory read/write API may be provided to interface with the overall computation by accessing the various memories described above.

The core architecture provided herein provide various advantages over alternative approaches. Reuse of synapse memory blocks is provided, allowing efficient reprogramming of physical cores. In various embodiments, low-precision neurons and synapses are used, simplifying the hardware requirements. Providing on-chip memory for storage of results and programming parameters reduces power consumption, and decreases latency. Similarly, providing time-multiplexed access to a physical core allows area efficiency.

Figure 7:
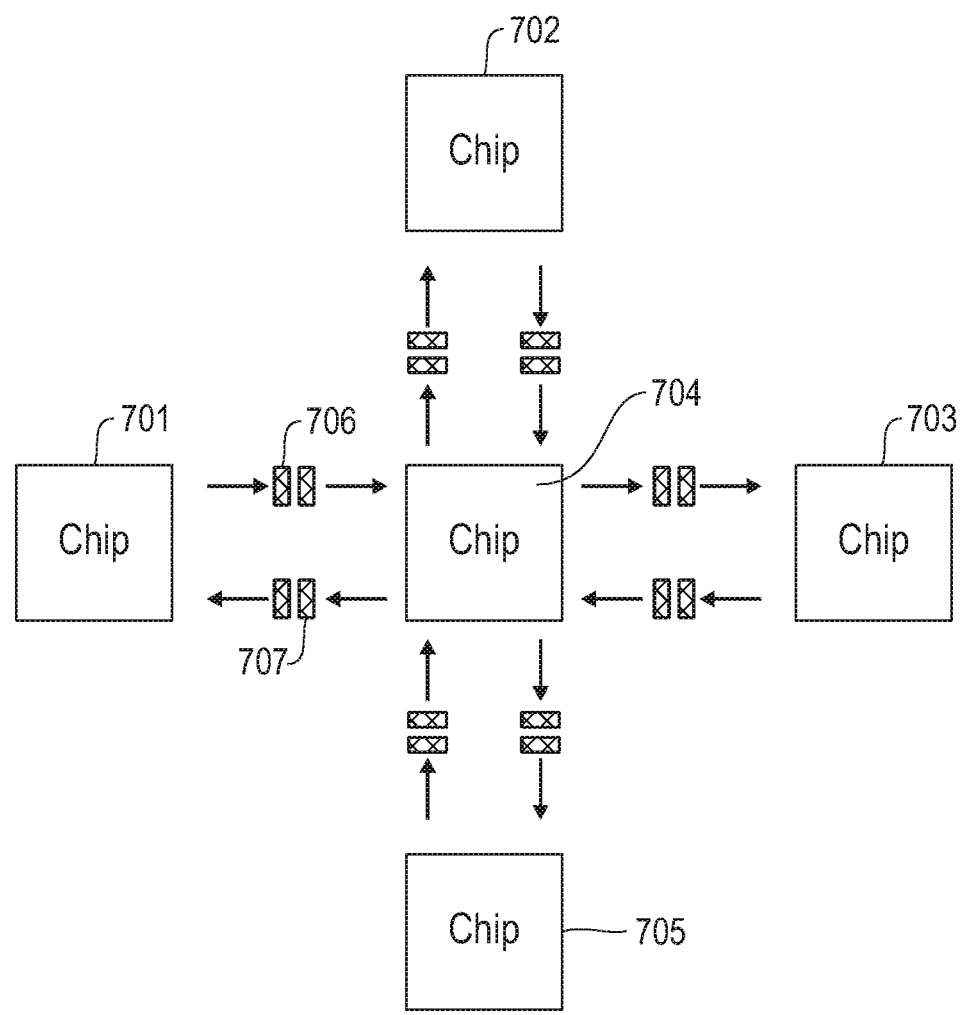
FIG. 7 illustrates an exemplary multi-chip layer according to embodiments of the present disclosure.

Referring now to FIG. 7, an exemplary multi-chip design is illustrated. A plurality of chips 701 . . . 705 are interconnected. In some embodiments, each chip 701 . . . 705 comprises one or more chip 600 as described above. The output stream 706 and input stream 707 of each chip is connected to a neighboring chip. In this way, multiple chips may be tiled to form a larger capacity system. It will be appreciated that the data streams 706, 707 may travel over a variety of networks between chips. In general, to minimize latency, connectivity may be preferred among neighboring chips. However, in various embodiments, more extensive connectivity may be provided.

Figure 8:
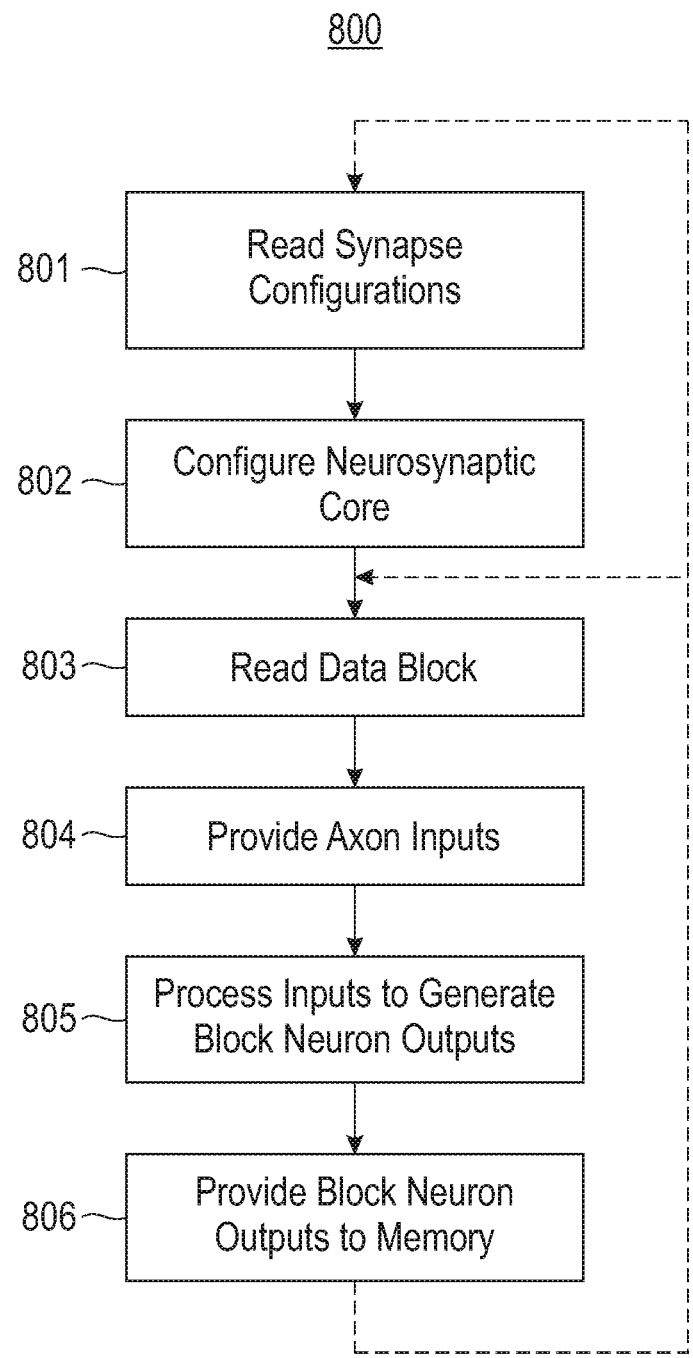
FIG. 8 illustrates a method for executing a neural network program according to embodiments of the present disclosure.

Referring to FIG. 8, a method of executing a neural network program is provided. At 801, synapse configurations for one of a plurality of logical cores are read from memory. At 802, a neurosynaptic core is configured to implement the one of the plurality of logical cores using the synapse configurations. The neurosynaptic core comprises a plurality of axons and a plurality of neurons interconnected by a plurality of configurable synapses. At 803, at least one data block is read from a memory. At 804, the at least one data block is provided as contiguous axon inputs to the neurosynaptic core. At 805, the axon inputs are processed by the neurosynaptic core to determine at least one contiguous block of neuron outputs. At 806, the neuron outputs are provided to the memory.

In various embodiments, processing continues by reading another data block at 803, or by reading new synapse configurations and reconfiguring the core at 801 . . . 802.

Figure 9:
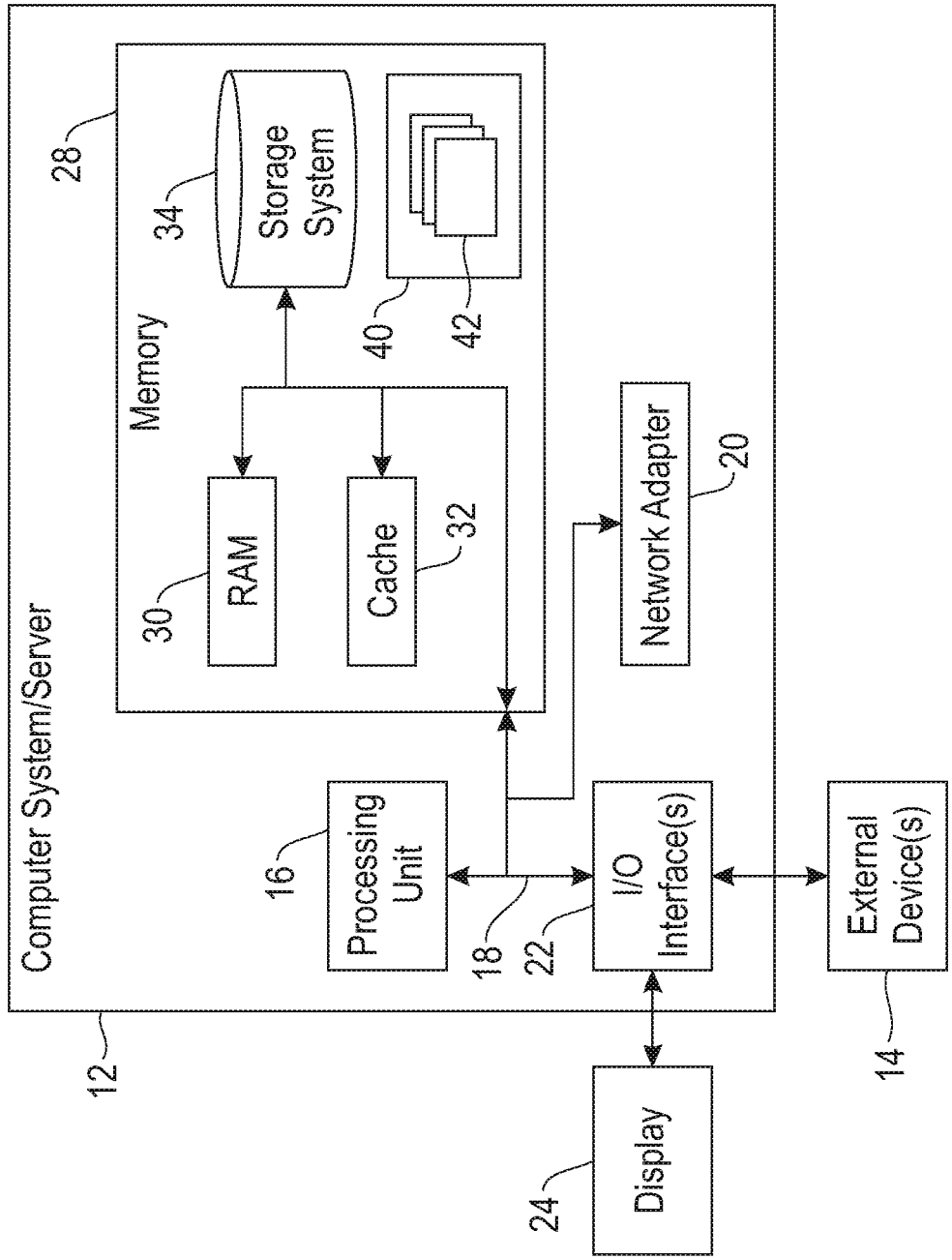
FIG. 9 depicts a computing node according to embodiments of the present disclosure.

Referring now to FIG. 9, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In various embodiments, one or more neurosynaptic core (not pictured) is coupled to bus 18. In such embodiments, a neurosynaptic core may receive data from or write data to memory 28 via bus 18. Likewise, a neurosynaptic core may interact with other components via bus 18 as described herein. In various embodiments, a neurosynaptic core may include one or more local controller, memory, or clock, for example as set forth elsewhere herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a plurality of physical neurosynaptic cores, a first physical neurosynaptic core of the plurality of physical neurosynaptic cores adapted to apply a plurality of synaptic weights to a plurality of input activations to produce a plurality of output activations,
wherein the system is adapted to perform a method comprising:
reading, from a neuron parameter memory, synaptic weights for one of a plurality of logical cores;
configuring the first physical neurosynaptic core to implement the one of the plurality of logical cores using the synaptic weights, said configuring comprising:
reading, into the first physical neurosynaptic core from a synapse memory, a first synaptic configuration associated with the one of the plurality of logical cores;
providing at least a first contiguous block of input activations to a plurality of axons of the first physical neurosynaptic core, wherein the plurality of axons comprises at least one block of spatially sequential axons;
processing the at least first contiguous block of input activations by the first physical neurosynaptic core to determine at least one contiguous block of output activations at a plurality of neurons of the first physical neurosynaptic core, wherein the plurality of neurons comprises at least one block of spatially sequential neurons;
configuring the first physical neurosynaptic core to implement another of the plurality of logical cores, said configuring comprising:
reading, into the first physical neurosynaptic core from the synapse memory, a second synaptic configuration associated with the other of the plurality of logical cores;

writing the at least one contiguous block of output activations to a portion of a data memory associated with the one of the plurality of logical cores; and providing, from the portion of the data memory, the at least one contiguous block of output activations to the first physical neurosynaptic core or a second physical neurosynaptic core of the plurality of physical neurosynaptic cores as a second contiguous block of input activations at the plurality of axons block of input activations each include a plurality of activations to be processed concurrently, and wherein the at least one contiguous block of output activations that are generated at the plurality of neurons of the first physical neurosynaptic core is directly used in a subsequent computation.

2. The system of claim 1, wherein the first physical neurosynaptic core comprises the plurality of axons and the plurality of neurons are interconnected by a plurality of configurable synapses.

3. The system of claim 1, wherein:
the neuron parameter memory coupled to the first physical neurosynaptic core and adapted to store synaptic weights corresponding to the plurality of logical cores and to provide the synaptic weights to the first physical neurosynaptic core.

4. The system of claim 3, wherein reading the synaptic weights comprises reading from the neuron parameter memory.

5. The system of claim 1, wherein:
the data memory coupled to the first physical neurosynaptic core and adapted to receive output activations from the first physical neurosynaptic core and to provide input activations to the first physical neurosynaptic core.

6. The system of claim 5, wherein providing at least the first contiguous block of input activations comprises reading at least the first contiguous block of input activations from the data memory.

7. The system of claim 1, wherein the method further comprises: providing the at least one contiguous block of neuron output activations as at least a third contiguous block of input activations to the first physical neurosynaptic core.

8. The system of claim 1, further comprising:
a memory mapped interface adapted to provide reading from and writing to each of the plurality of logical cores.

9. The system of claim 1, wherein the first physical neurosynaptic core is adapted to compute multiple neuron output activations concurrently by the application of multiple dendrite trees.

10. The system of claim 1, wherein the plurality of logical cores define a multi-core neural network, and wherein the method comprises configuring the first physical neurosynaptic core to implement each of the plurality of logical cores in sequence.

11. The system of claim 1, each of the plurality of physical neurosynaptic cores having an associated portion of the synapse configuration memory and an associated portion of a data memory, wherein each of the plurality of physical neurosynaptic cores is adapted to receive contiguous blocks of output activations from others of the plurality of physical neurosynaptic cores for processing as contiguous blocks of input activations and to send contiguous blocks of output activations for processing as contiguous blocks of input activations thereto via a network.

12. The system of claim 1, wherein the at least one contiguous block of output activations is directly used in the subsequent computation without bit-by-bit reshuffling.

13. A method comprising:
reading, from a neuron parameter memory, synaptic weights for one of a plurality of logical cores;

configuring a first physical neurosynaptic core to implement the one of the plurality of logical cores using the synaptic weights, the first physical neurosynaptic core being adapted to apply a plurality of synaptic weights to a plurality of input activations to produce a plurality of output activations, said configuring comprising:

reading, into the first physical neurosynaptic core from a synapse memory, a first synaptic configuration associated with the one of the plurality of logical cores;

providing at least a first contiguous block of input activations to a plurality of axons of the first physical neurosynaptic core, wherein the plurality of axons comprises at least one block of spatially sequential axons;

processing the at least first contiguous block of input activations by the first physical neurosynaptic core to determine at least one contiguous block of output activations at a plurality of neurons of the first physical neurosynaptic core, wherein the plurality of neurons comprises at least one block of spatially sequential neurons;

configuring the first physical neurosynaptic core to implement another of the plurality of logical cores, said configuring comprising:

reading, into the first physical neurosynaptic core from the synapse memory, a second synaptic configuration associated with the other of the plurality of logical cores;

writing the at least one contiguous block of output activations to a portion of a data memory associated with the one of the plurality of logical cores; and providing, from the portion of the data memory, the at least one contiguous block of output activations to the first physical neurosynaptic core or a second physical neurosynaptic core as a second contiguous block of input activations at the plurality of axons thereof, wherein the at least one contiguous block of output activations and the first contiguous block of input activations each include a plurality of activations to be processed concurrently, and wherein the at least one contiguous block of output activations that are generated at the plurality of neurons of the first physical neurosynaptic core is directly used in a subsequent computation.

14. The method of claim 13, wherein the plurality of axons and the plurality of neurons are interconnected by a plurality of configurable synapses.

15. The method of claim 13, wherein reading the synaptic weights comprises reading the synaptic weights from the neuron parameter memory coupled to the first physical neurosynaptic core.

16. The method of claim 13, wherein providing at least the first contiguous block of input activations comprises reading at least the first contiguous block of input activations from the data memory coupled to the first physical neurosynaptic core.

17. The method of claim 13, further comprising:
providing the at least one contiguous block of neuron output activations as at least a third contiguous block of input activations to the first physical neurosynaptic core.

18. The method of claim 13, wherein the second data memory comprises:
a memory mapped interface adapted to provide reading from and writing to each of the plurality of logical cores.

19. The method of claim 13, wherein the first physical neurosynaptic core is adapted to compute multiple neuron output activations concurrently by the application of multiple dendrite trees.

20. The method of claim 13, wherein the plurality of logical cores define a multi-core neural network, and wherein the method comprises:
configuring the first physical neurosynaptic core to implement each of the plurality of logical cores in sequence.

21. The method of claim 13, further comprising:
sending contiguous blocks of output activations from the first physical neurosynaptic core to a second physical neurosynaptic core for processing as contiguous blocks of input activations by the second physical neurosynaptic core via a network.

22. A computer program product for executing a neural network program, the computer program product comprising a computer readable storage medium having program instructions embodied therewith, the program instructions executable by a processor to cause the processor to perform a method comprising:
reading, from a neuron parameter memory, synaptic weights for one of a plurality of logical cores;
configuring a first physical neurosynaptic core to implement the one of the plurality of logical cores using the synaptic weights, the first physical neurosynaptic core being adapted to apply a plurality of synaptic weights to a plurality of input activations to produce a plurality of output activations, said configuring comprising:
reading, into the first physical neurosynaptic core from a synapse memory, a first synaptic configuration associated with the one of the plurality of logical cores;
providing at least a first contiguous block of input activations to a plurality of axons of the first physical neurosynaptic core, wherein the plurality of axons comprises at least one block of spatially sequential axons;
processing the at least first contiguous block of input activations by the first physical neurosynaptic core to determine at least one contiguous block of output activations at a plurality of neurons of the first physical neurosynaptic core, wherein the plurality of neurons comprises at least one block of spatially sequential neurons;
configuring the first physical neurosynaptic core to implement another of the plurality of logical cores, said configuring comprising:
reading, into the first physical neurosynaptic core from the synapse memory, a second synaptic configuration associated with the other of the plurality of logical cores;
writing the at least one contiguous block of output activations to a portion of a data memory associated with the one of the plurality of logical cores; and
providing, from the portion of the data memory, the at least one contiguous block of output activations to the first physical neurosynaptic core or a second physical neurosynaptic core as a second contiguous block of input activations at the plurality of axons thereof, wherein the at least one contiguous block of output activations and the first contiguous block of input activations each include a plurality of activations to be processed concurrently,
wherein the at least one contiguous block of output activations that are generated at the plurality of neurons of the first physical neurosynaptic core is directly used in a subsequent computation.

* * * * *